April 26, 1949.  D. B. SMITH  2,468,691
HYGROMETRY
Filed May 30, 1944  2 Sheets-Sheet 1
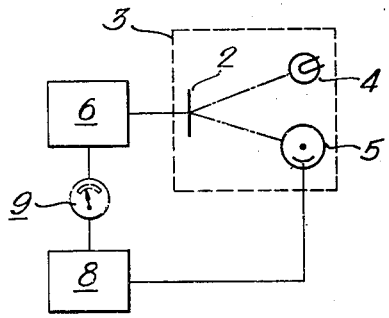
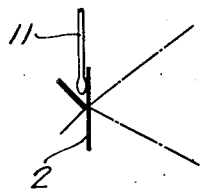
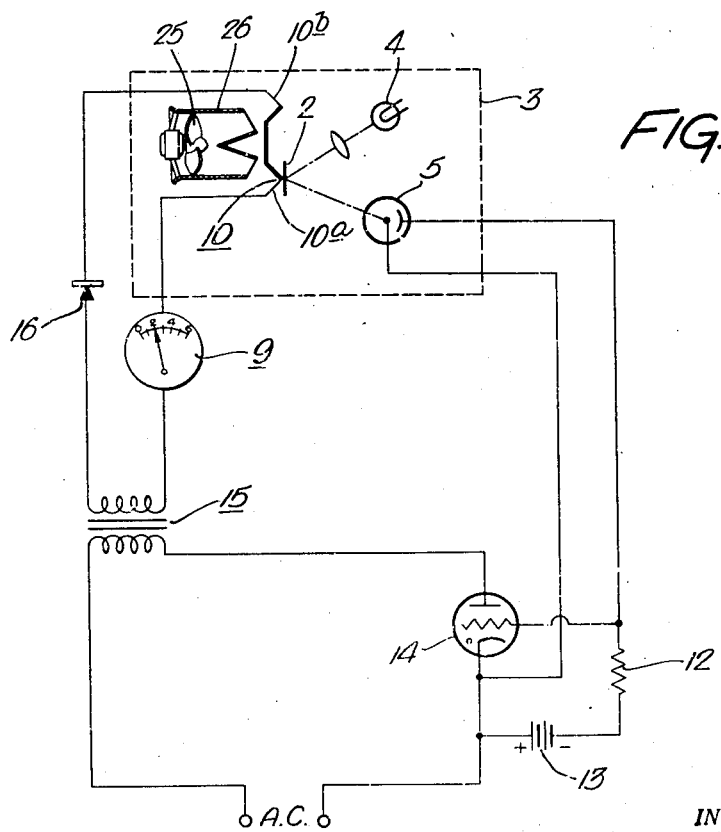
INVENTOR.
David B. Smith
by his Attorneys
Howson & Howson Patented Apr. 26, 1949

2,468,691

UNITED STATES PATENT OFFICE 2,468,691

HYGROMETRY

David B. Smith, Flourtown, Pa., assignor, by mesne assignments, to Philco Corporation, Philadelphia, Pa., a corporation of Pennsylvania Application May 30, 1944, Serial No. 538,068

5 Claims. (Cl. 236—44)

This invention relates, generally, to hygrometry and is especially concerned with apparatus for determining the dew-point temperature of a gas.

More particularly, the invention has to do with the application of such apparatus to air conditioning or refrigeration and, in one aspect, the invention is concerned with the utilization of such apparatus to both indicate and control the percentage of relative humidity within an enclosed space.

It is often necessary to determine dew-point temperature and relative humidity conditions, particularly in connection with air conditioning or refrigeration, and ready and accurate determination of such factors has, heretofore, presented substantial problems. For example, the more accurate of the devices previously employed have required rather lengthy and precise hand manipulation, and the indications thereof have been discontinuous; that is, it was necessary to repeat the operations for each set of new conditions. While hygrometers have been developed which are entirely automatic in their operation, such for example as the type employing a strand of hair, the accuracy of these cannot be relied upon, especially after extended periods of use. In addition, many of the prior devices have required lengthy time periods to obtain readings; which fact renders them unfit for control purposes.

By the present invention, the foregoing and other difficulties and objections encountered in devices of this type are eliminated and, to this end, an important object of the invention resides in the provision of an improved apparatus for supplying continuous representations indicative of dew-point temperature and relative humidity conditions.

A more specific object of the present invention is to provide such an apparatus having means for maintaining an element thereof at dew-point temperature, said means being responsive to and controlled by the degree of moisture deposition upon said element.

In one aspect, the invention also contemplates such an apparatus, in which the indications thereof are utilized to control the percentage of relative humidity within the space being conditioned or refrigerated.

A still further object of the present invention resides in the provision of an apparatus for cooling an element to the dew-point temperature, which apparatus is simple and inexpensive to construct and operate and employs no moving parts.

The foregoing and other objects and advantages will be best understood by a consideration of the following description taken in conjunction with the accompanying drawings, in which:

Fig. 1 is a block diagram illustrating an apparatus embodying the invention;

Fig. 2 is a view in greater detail of the apparatus illustrated in Fig. 1;

Fig. 3 is a fragmentary elevational view, illustrating certain details of a modification of the invention;

Figure 4:
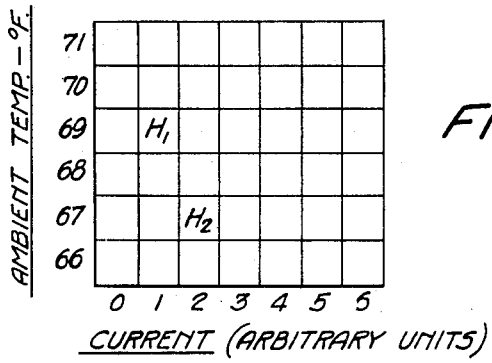
Fig. 4 is a representation of a graph which may be used in conjunction with the present invention.

As illustrated in Figs. 1 and 2 of the drawings, and first briefly described, the invention comprises an element 2 mounted within a space 3, which space is adapted to be cooled to air-conditioning or refrigeration temperatures by any convenient means known in the art; a light source 4 and a photoelectric cell 5 being arranged to cooperate with said element, in a manner more fully set forth hereinafter. As shown in the block diagram, a device 6 is adapted to cool the element 2, and apparatus, indicated at 8, is constructed and arranged to control the degree to which the device 6 cools the element 2, the control being effected in accordance with the conductivity of the photoelectric cell 5. An indicator, designated by the reference numeral 9, is utilized to indicate the amount of energy being supplied to element 2, in order to maintain said element at the dew-point temperature.

The device 2 preferably takes the form of a polished reflecting surface of high thermal conductivity, for example a metal mirror, although it will be evident that a smooth, transparent surface could be employed. In the embodiment illustrated, a thermocouple 10, (or a plurality thereof) is arranged to produce a reduction of mirror temperature by the utilization of what is known in electrical arts as the Peltier effect. While the essentials of the thermocouple circuit and its power supply will be given below, it will be understood that the details of the construction and arrangement of this portion of the apparatus form no part of the present invention, per se, and extensive description thereof is accordingly not deemed necessary herein.

For the purposes of this description, the enclosure 3 will be considered to be a room or other space to be air-conditioned, it being understood that the mirror 2 is mounted within said space, and that the ambient temperature (with respect to said mirror) is maintained within fairly close limits. By utilization of the thermocouple 10, and in a manner more fully described hereinafter, the mirror is cooled to the dew-point temperature of the air within the space 3. This temperature will always be less than the ambient temperature in said space. Accordingly, at any mirror temperature encountered in practice, there will be heat flow to the mirror from the air in said space, and a consequent tendency for the temperature of said mirror to rise. This effect is opposed by the action of the thermocouple, which takes as much heat from the mirror as the mirror absorbs from the said space. The greater the temperature differential between the mirror and the ambient temperature, the greater must be the electrical energy supplied to the mirror to maintain said temperature differential. Therefore, the amount of energy required to maintain the mirror at a particular dew-point temperature, is a function of said temperature, and by suitably calibrating the ammeter, shown at 9, it is possible to obtain a reading on said ammeter which will bear a predetermined relation to the differential between the mirror and the ambient temperature and, consequently, as the ambient temperature is maintained within reasonably close limits, the ammeter reading will provide a direct indication of the variations in dew-point temperature, and the percentage of relative humidity.

If desired, and as shown at 11 in Fig. 3, a conventional thermometer may be employed to indicate the mirror temperature directly. The bulb of this thermometer is preferably flattened and secured in high heat exchange relation with the rear surface of mirror 2. The indications of this instrument will, of course, represent the dew-point temperature directly.

In order to maintain the mirror at the dew-point temperature, as variations occur in the humidity conditions within the enclosure 3, the invention contemplates the provision of apparatus adapted to supply controlled amounts of energy to the thermocouple, in accordance with the degree of moisture deposition upon the mirror, that is, in accordance with small variations of the mirror temperature to either side of the true dew-point temperature. To this end, the invention provides a photoelectric control system comprising the light source 4, cell 5, and resistor 12; the resistor and the photo-electric cell being serially connected across the battery indicated at 13. The cathode-anode circuit of a thyratron 14 is connected across a suitable A. C. source, and this circuit includes the primary winding of an output transformer 15. It will be observed that resistor 12 and photoelectric cell 5 comprise a voltage dividing circuit; the voltage drop across the cell being the voltage supplied to the grid-cathode circuit of the thyratron.

Current to the thermocouple is supplied by the secondary winding of transformer 15, the current being rectified by any suitable rectifier, as has been indicated at 16. The current in the primary winding of the transformer 15 is controlled by the current flowing in the plate circuit of the thyratron 14, whose grid voltage is determined by the amount of light falling on the photo-cell 5.

The thermocouple 10 is composed of dissimilar metals, (for example bismuth and antimony, the bismuth being represented by the heavier conductor connecting the two junctions 10a and 10b) of such a nature as to produce a substantial Peltier effect. The cold junction 10a of the thermocouple circuit is, of course, arranged in high heat-conducting relation with the mirror 2; while the hot junction 10b of the circuit is preferably maintained at the ambient temperature existing within the enclosure, in order that the cold junction will not be operated against an unnecessarily high thermal head. As will be understood, in order to utilize the temperature reduction arising from the Peltier effect, the hot and cold junctions comprise two distinct regions, that is, one in which the Peltier cold is concentrated, and one in which both the Joule and Peltier heats are dissipated. Preferably a small fan 25, having an associated baffle structure 26, is arranged to maintain circulation of the air about the thermocouple junctions so as to prevent the formation of still air pockets about said junctions. As shown, the cooling of the mirror is accomplished by utilization of the Peltier effect, because of its simplicity and its lack of moving parts.

The operation of the photoelectric cell and thyratron circuits will be evident to those skilled in the electronic arts, on the basis of the circuit description outlined above. However, it may be stated that the thyratron is so operated that pulses of electrical energy are supplied to the primary winding of the transformer 15, during each positive half-cycle of the alternating current applied to the anode of said thyratron. The duration of these pulses (and consequently the amount of energy supplied) is controlled by the grid-cathode potential of the thyratron; said potential being controlled, in turn, by the amount of illumination falling on the photo-electric cell 5.

As will now be understood, the mirror 2 is cooled by passing current through the thermocouple 10 until condensation occurs on the surface of the mirror. Such condensation will reduce the amount of illumination on the cell, thereby causing it to become less conductive, with the result that the negative bias on the grid of the thyratron 14 is increased. This reduces the power flow into the transformer which, in turn, causes a reduction in the current flowing in the thermocouple circuit and with it, a diminution of the cooling effect. Fogging will continue until the thyratron reduces the thermocouple current sufficiently to prevent any further increase in the moisture deposition upon the mirror. An increase in the percentage of relative humidity within the enclosure will increase the fogging of the mirror, and this fogging will cause a corresponding decrease in thermocouple current until equilibrium is reached.

Similarly, a decrease in the relative humidity will tend to lessen the moisture deposition, increasing both the illumination and the current flowing in the plate circuit of the thyratron, with the result that the temperature of the mirror is again reduced to an equilibrium value, as determined by the fogging thereof.

It is evident that the current measured by the ammeter 9 is a function of the dew-point temperature and, consequently, either the dew-point temperature or the relative humidity may be obtained by employing a number of scales on the ammeter, each for a different ambient temperature.

Where the operating conditions are such that there may be a relatively wide variation in ambient temperature, a chart of the type illustrated in Fig. 4 may conveniently be employed. In this chart, the ordinates represent ambient temperature in degrees Fahrenheit while the abscissae may represent current in convenient arbitrary units. At the intersection of the selected temperature and current readings there will appear a particular value of relative humidity (represented at H₁ and H₂ in Fig. 4). It will be understood that the relative humidity readings may readily be supplied on such a chart by calibration accomplished, for example, by the use of the ordinary dry-wet bulb humidity meter.

Figure 5:
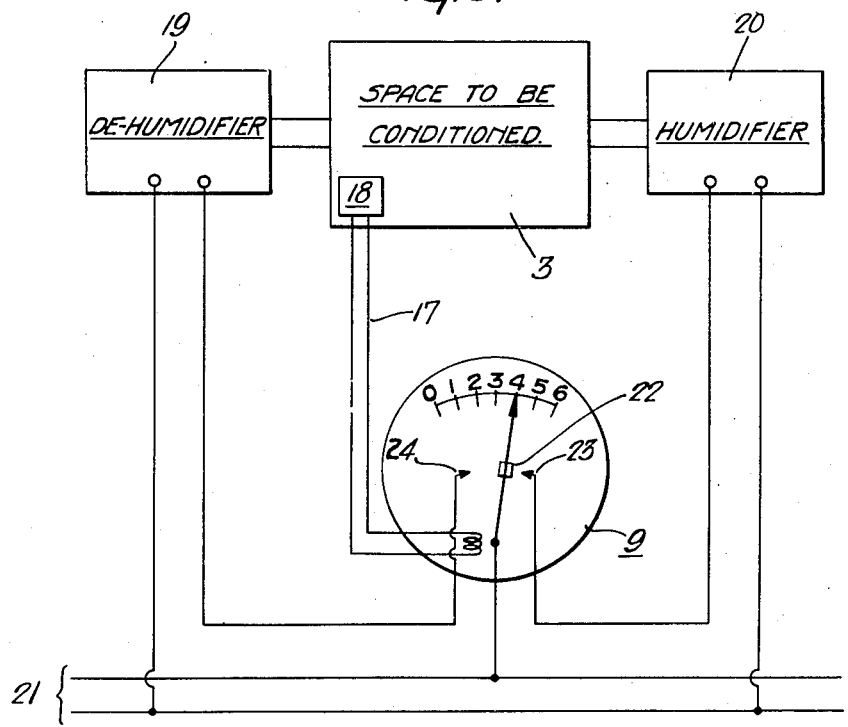
Fig. 5 is a diagrammatic illustration showing one way in which the invention may be applied to air-conditioning or refrigeration.

As illustrated in Fig. 5, the invention is well adapted to maintaining the percentage of relative humidity within any desired predetermined limits, and the drawing diagrammatically illustrates one apparatus by means of which such control may be accomplished.

The ammeter 9, in this instance, is of the contact-making type and is connected through leads 17 to an apparatus of the character shown in Fig. 2 and represented at 18 in Fig. 5. Suitable devices 19 and 20 for effecting humidification and dehumidification, respectively, are provided, and may take any desired known form. For example, the humidifier might comprise a vessel containing water and incorporating a heater and a circulating fan. The heater and the fan may be actuated together by closing of the contacts 22 and 23. Similarly, and again by way of example, the dehumidifier may conveniently include a fan for circulating the room air over an evaporator or other element, maintained at a temperature below the dew point. This device would be actuated by the completion of the circuit through contacts 22 and 24.

These devices are both adapted for connection across the line 21, through the ammeter 9, connection being effected by using a meter of the contact-making type.

Such a control apparatus makes it possible to maintain the percentage of relative humidity within predetermined limits, avoiding, on the one hand, extreme saturation and consequent undesirable condensation and, on the other hand, excessively low humidity conditions which are equally undesirable. In order to maintain the relative humidity within a range of permissible values, the apparatus has a range of equilibrium positions at which no contact is made.

From the foregoing description, it will be seen that the invention provides a novel apparatus capable of continuously supplying accurate representations indicative of both dew-point temperature and relative humidity conditions. In the broad aspect, the invention includes the novel concept involved in supplying energy to cool an element to the dew-point temperature, and then utilizing the degree of moisture deposition upon said element to control the energy input to the cooling apparatus.

While the invention has been described as particularly applicable to the determination of the percentage of water vapor in air at the particular temperature of the air, it will be evident that it is also applicable to the determination of the content of other condensable vapors in air or other gases.

While a preferred structural embodiment of the invention has been illustrated, it should be understood that certain details thereof are merely illustrative, and that the invention contemplates such changes and modifications as may come within the scope of the subjoined claims.

I claim:

1. In apparatus for indicating the moisture content of a gas, a body subjected to the gas, and upon which moisture may be deposited, means including a thermocouple in high heat exchange relation with said body and associated power supply for cooling said body to the dew-point temperature, and means including a photo-sensitive element responsive to the degree of moisture deposition upon said body to regulate the supply of energy to said thermocouple so as to regulate further cooling of said body after the dew-point temperature has been reached.

2. In apparatus for indicating the moisture content of a gas, a body subjected to the gas and upon which moisture may be deposited, means including a thermocouple in high heat exchange relation with said body and associated power supply for cooling said body to the dew-point temperature, means including a photo-sensitive element responsive to the degree of moisture deposition upon said body to regulate the supply of energy to said thermocouple so as to regulate further cooling of said body after the dew-point temperature has been reached, and means for measuring the power being supplied to said thermocouple.

3. In an apparatus for detecting the moisture content of a gas, a body subjected to the gas and upon which moisture may be deposited, a thermocouple in high heat exchange relation with said body to effect cooling of said body in accordance with the Peltier effect, means for supplying electrical energy to said thermocouple to effect cooling of said body to the dew-point temperature, and means responsive to the degree of moisture deposition upon said body for regulating the supply of electrical energy to said thermocouple.

4. In an apparatus for controlling the moisture content of a gas within an enclosure, a body subjected to the gas and upon which moisture may be deposited, a thermocouple in high heat exchange relation with said body to effect cooling of said body in accordance with the Peltier effect, means for supplying electrical energy to said thermocouple to effect cooling of said body to the dew-point temperature, means responsive to the degree of moisture deposition upon said body for regulating the supply of electrical energy to said thermocouple, and means controlled by said electrical energy for varying the moisture content of said gas.

5. In an apparatus for detecting the moisture content of a gas, a body subjected to the gas and upon which moisture may be deposited, a thermocouple in high heat exchange relation with said body to effect cooling of said body in accordance with the Peltier effect, means for supplying electrical energy to said thermocouple to effect cooling of said body to the dew-point temperature, a thyratron arranged to control the supply of electrical energy to said thermocouple, and means responsive to the degree of moisture deposition upon said body for controlling said thyratron so as to regulate the supply of electrical energy to said thermocouple.

DAVID B. SMITH.

REFERENCES CITED

The following references are of record in the file of this patent:

UNITED STATES PATENTS

| Number | Name | Date |
| --- | --- | --- |
| 1,860,377 | Anderson | May 31, 1932 |
| 1,960,658 | Brace | May 29, 1934 |
| 2,240,082 | Thornthwaite | Apr. 29, 1941 |
| 2,268,785 | Thornthwaite | Jan. 6, 1942 |

FOREIGN PATENTS

| Number | Country | Date |
| --- | --- | --- |
| 317,306 | Great Britain | Aug. 12, 1929 |